Feb. 1, 1966 W. R. ATTWOOD 3,232,393
BEAM CLAMP
Filed Nov. 25, 1960 2 Sheets-Sheet 1

WARREN R. ATTWOOD
INVENTOR
BY Cedric W. Porter
ATTORNEY

Feb. 1, 1966 W. R. ATTWOOD 3,232,393
BEAM CLAMP

Filed Nov. 25, 1960 2 Sheets-Sheet 2

WARREN R. ATTWOOD
INVENTOR
BY Cedric W. Porter
ATTORNEY

United States Patent Office 3,232,393
Patented Feb. 1, 1966

3,232,393
BEAM CLAMP
Warren R. Attwood, Belleville, Mich. (% Attwood Development Co., 4077 Second St., Wayne, Mich.)
Filed Nov. 25, 1960, Ser. No. 71,747
4 Claims. (Cl. 189—35)

This invention relates to beam clamps, and more particularly to beam clamps designed for use with adjustable metal framing systems.

A beam clamp of the type herein disclosed is designed to be attached to the flanges of steel I-beams, and to other beams, and structural elements of metal framing constructions, as a supporting element for other connecting framing members, such as angles, channels and tubes. A principal object of my invention is to provide a beam clamp of great inherent strength and resistance to slipping, and to provide a beam clamp of great versatility and adaptability in supporting many types of connecting framing members, with adjustability in three directions, and in four different bolting positions, i.e., from the front or open side of the clamp, from the bottom, and from both sides, or sixteen different bolting combinations for supporting connecting framing members.

Other advantages of my device will appear in the following specification and drawings, in which.

Figure 1:
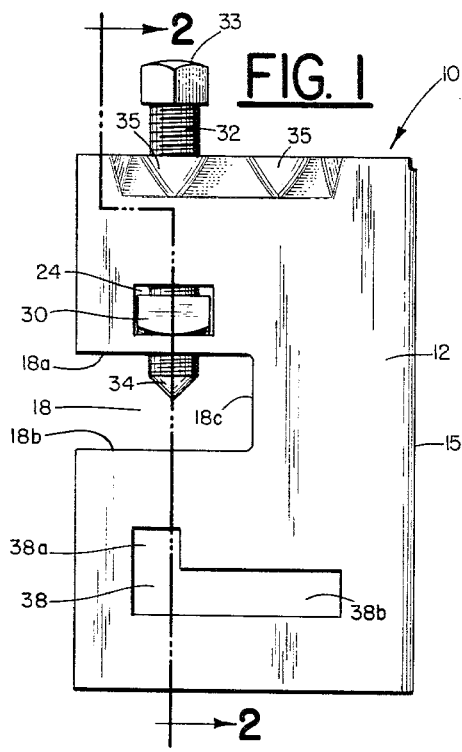
FIG. 1 is a side elevation of my beam clamp.
Figure 2:
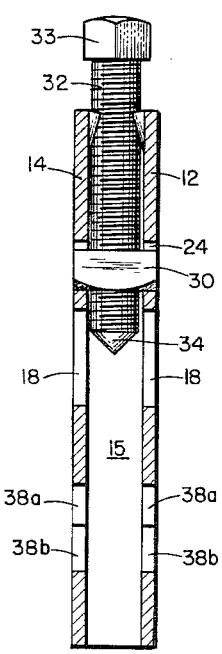
FIG. 2 is a vertical section on line 2—2 of FIG. 1.
Figure 3:
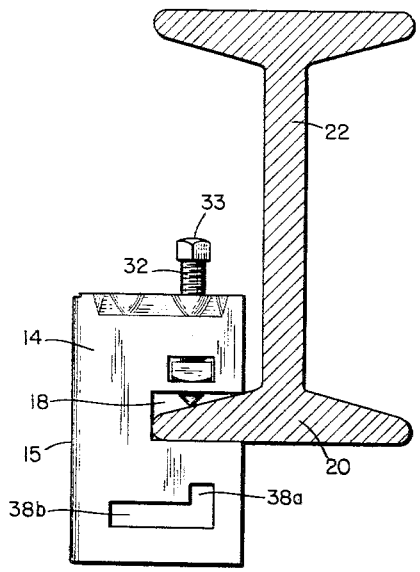
FIG. 3 is a perspective view of my beam clamp showing it attached to an I-beam.

In the drawings my beam clamp is shown as it will normally be used, attached to the flange of a horizontal I-beam, but it will be understood that the clamp can be used on and affixed to other structural framing elements extending in other than a horizontal position. Thus the terms horizontal and vertical as used herein are relative, and apply to the beam clamp used as shown in the drawings herein. In the drawings 10 refers to my beam clamp generally, which comprises a flat metal sheet bent to form two parallel sides, the front side 12, and rear side 14, respectively, connected by the web 15 (FIG. 4) and hence open at the front, top, and bottom ends or edges and closed at the back end by the web 15.

A fixed open jaw or slot 18 is provided on the open side of the clamp extending through both the front side 12 and rear side 14 and comprises the top and bottom edges 18a and 18b respectively and vertical rear edge 18c. The jaw 18 is designed to receive the flange 20 of an I-beam 22 or other structural framing element. A closed slot 24, preferably rectangular in shape and with its longitudinal axis in a horizontal plane, is provided in the front and rear sides 12 and 14 of my beam clamp above the open jaw 18 and is designed to hold firmly in position a threaded nut 30 mounted on a set screw 32 having a square head 33 at its top end and preferably a pointed bottom end 34, which is designed to bite into the horizontal flange 20 of an I-beam 22, for instance, whereby the beam clamp may be securely attached to an I-beam 22 or other structural framing element, as shown in FIGS. 3, 4, 5 and 6. The top edge of the beam clamp 10 is crimped above the slot 24 as at 35 to provide guiding edges for the bolt 32 and to hold the bolt 32 in vertical alignment with the slot 24 when the nut 30 is mounted thereon. It will be readily understood that the beam clamp 10 may be securely attached to a flange 20 of an I-beam 22 by screwing the bolt 32 downwardly until the pointed end 34 bites into the metal of the flange 20 of the I-beam 22. It will be understood that the end 34 of the lower surface of the bolt 32, instead of being pointed, may be roughened or serrated to firmly bite into the flange 20 of the I-beam 22 or other structural framing member.

Figure 4:
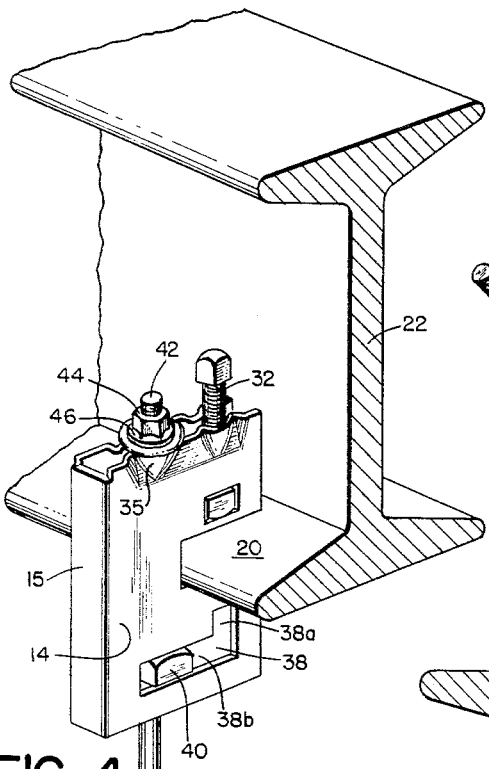
FIG. 4 is a perspective view of my beam clamp showing use of a vertically supporting hanger rod.
Figure 5:
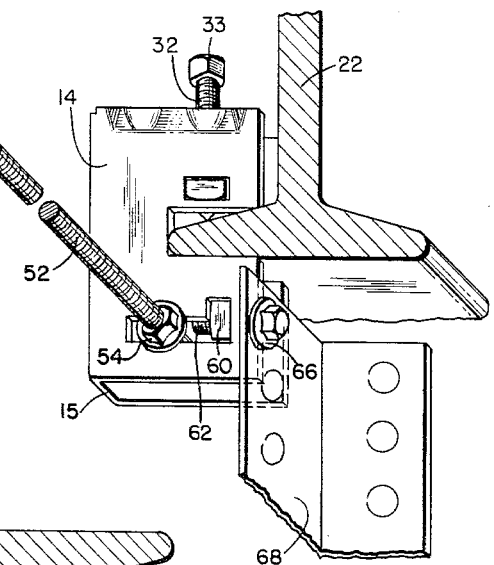
FIG. 5 is a perspective view of my beam clamp showing a horizontal bolt support for a vertically extending framing member.

A second closed slot 38, comprising the vertically extending rectangular portion 38a and horizontally extending rectangular portion 38b is provided in the lower portion of the beam clamp 10 below the open jaw 18, and again extends through both the front sides 12 and 14 of the beam clamp 10. The horizontal portion 38b of the slot 38 is long enough to accommodate two nuts 40 which may be carried on elongated bolts such as bolt 42 (FIG. 4), which is supported from the open top edge of the beam clamp by a suitable nut 44 and washer 46 as shown in FIG. 4 or other bolt with an enlarged head (not shown). Again the top edge of the beam clamp is crimped as at 35 to provide guide means for holding such elongated bolt 42 in vertical alignment with the nut 40 in the horizontal portion 38b of the slot 38. The elongated bolt 42, supported in the beam clamp 10, as shown in FIG. 4, thus provides vertical support or suspension for additional fittings or structural elements (not shown) to be suspended therefrom. At the same time, as shown in FIG. 5, the horizontal portion 38b of slot 38 may be used to hold a horizontal bolt 52 with threaded nuts 54 firmly securing the bolt 52 in position on the beam clamp 10 for supporting additional framing elements therefrom (not shown). At the same time FIG. 5 shows how the vertically extending portion 38a of the slot 38 may be used to firmly hold a nut 60 on a bolt 62 horizontally extending through the open side of the clamp 10 with washer 66 for support and suspension of another vertically extending framing member such as the angle iron 68.

Figure 6:
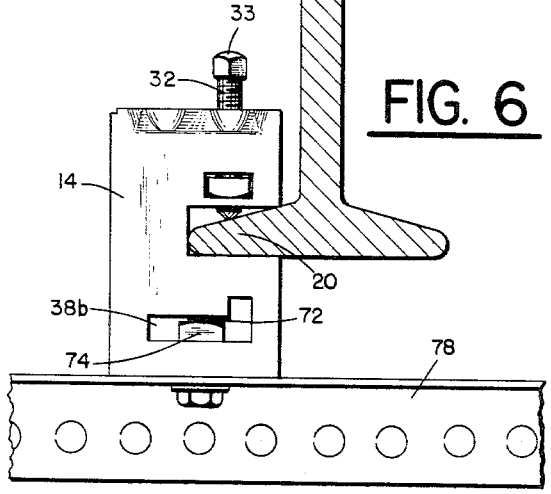
FIG. 6 is a perspective view of my beam clamp showing a vertical bolt support for a horizontally extending framing member.

Again FIG. 6 shows how the horizontal portion 38b of the slot 38 may be used, with nut 74 on vertically supported bolt 72, which on its lower end serves to support the horizontally extending angle member 78.

It will be understood that the slot 38 with its vertically and horizontally extending portions 38a and 38b may be made as two separate slots, without departing from my invention. But for added advantages I prefer to make the slot 38 as a single L-shaped slot with connecting portions 38a and b.

It will thus be seen that my beam clamp provides means for securely clamping the beam clamp to the horizontal flange 20 of an I-beam 22, and that from the beam clamp 10 thus secured, means may be provided for vertical and horizontal support of additional structural framing elements therefrom, with great flexibility and adjustability. Four different bolting adjustments are thus possible with my beam clamp, two horizontal as shown in FIG. 5, and two vertical as shown in FIGS. 4 and 6, or sixteen different combinations for supporting other structural framing elements—a versatility not possible in any other clamping means.

I claim:

1. A beam clamp comprising in combination, a substantially rectangular sheet metal member having two spaced parallel sides, open at the front, top and bottom ends and closed at the back, a fixed open jaw provided on the front end of said parallel sides adapted to receive a beam element, a closed slot provided in said parallel sides parallel to said fixed open jaw, a threaded nut seated in said closed slot, a threaded set screw extending through said threaded nut into said open jaw adapted to grip said beam element, a second slot in said parallel sides parallel to said fixed open jaw adapted to receive a threaded nut and bolt extending through said open bottom end to support a hanger element, and a third slot in said parallel sides parallel to said front open side, adapted to receive a threaded nut and bolt extending through said front open side.

2. A beam clamp comprising in combination, a substantially rectangular sheet metal member having two spaced parallel sides, open at the front, top and bottom ends and closed at the back, a fixed open jaw provided on the front end of said parallel sides adapted to receive a beam element, a closed slot provided in said parallel sides parallel to said fixed open jaw, a threaded nut seated in said closed slot, a threaded set screw extending through said threaded nut into said open jaw adapted to grip said beam element, a second closed slot in said parallel sides below said fixed open jaw having horizontal and vertical portions, adapted to receive a threaded nut and bolt extending through said open bottom end, and said open front end, respectively.

3. A beam clamp comprising in combination, a substantially rectangular sheet metal member having two spaced parallel sides, open at the front, top and bottom ends and closed at the back by a connecting web, a fixed open slot jaw provided on the front end of said parallel sides adapted to receive a beam element, a close slot provided in said parallel sides above and parallel to said fixed open jaw, a threaded nut seated in said closed slot, a threaded set screw having a pointed end extending through said threaded nut into said open jaw adapted to clamp onto said beam element, a second closed slot in said parallel sides below and parallel to said fixed open jaw adapted to receive a threaded bolt and nut extending through said open bottom end to support a hanger element, and a third slot in said parallel sides parallel to said front open side, adapted to receive a threaded nut and bolt extending through said front open side.

4. A beam clamp comprising in combination, a substantially rectangular sheet metal member having two spaced parallel sides, open at the front, top and bottom ends and closed at the back by a connecting web, a fixed open slot jaw provided on the front end of said parallel sides adapted to receive a beam element, a closed slot provided in said parallel sides above and parallel to said fixed open jaw, a threaded nut seated in said closed slot, a threaded set screw having a pointed end extending through said threaded nut into said open jaw adapted to clamp onto said beam element, a second closed slot in said parallel sides below and parallel to said fixed open jaw, adapted to receive a second threaded nut and a threaded bolt adapted to extend through said second threaded nut and to extend vertically through said open bottom end to support a hanger element, a third closed slot in said parallel sides parallel to said front open side, adapted to receive a third threaded nut and a threaded bolt adapted to extend through said third threaded nut and to extend horizontally through said front open side to support a hanger element.

References Cited by the Examiner
UNITED STATES PATENTS

| 1,794,976 | 3/1931 | Mueller | 144—304 X |
| 2,598,130 | 5/1952 | Mallison. | |
| 2,659,561 | 11/1953 | Kindorf | 24—243 |
| 2,676,629 | 4/1954 | Solum | 144—304 |

FRANK L. ABBOTT, *Primary Examiner.*

JOEL REZNEK, RICHARD W. COOKE, JR., JACOB L. MACKENOFF, *Examiners.*